Nov. 27, 1956  B. LONG  2,771,711
APPARATUS FOR CONDITIONING GLASS WHICH IS
TO BE CONTINUOUSLY DRAWN INTO SHEETS
Filed Aug. 1, 1955  3 Sheets-Sheet 2
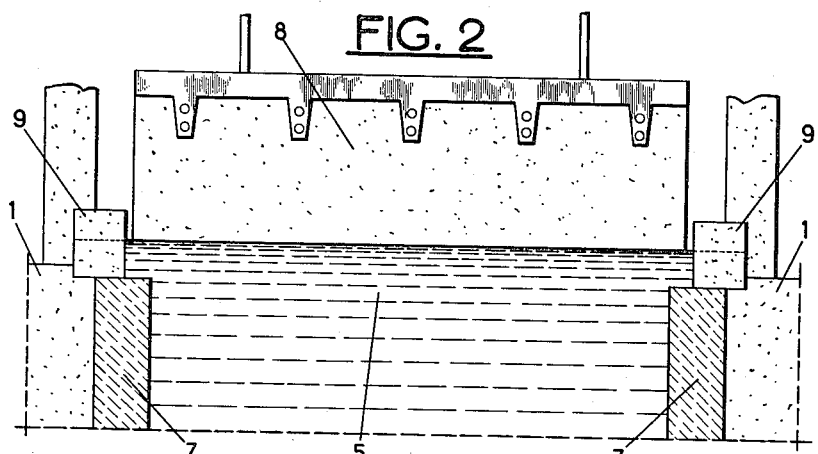
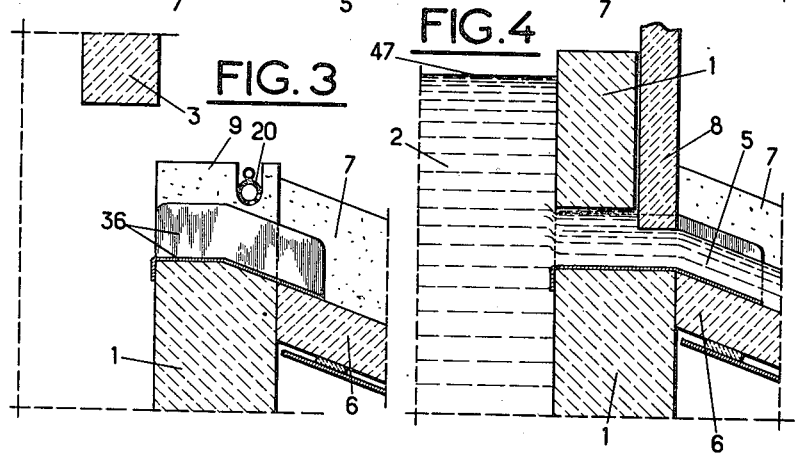
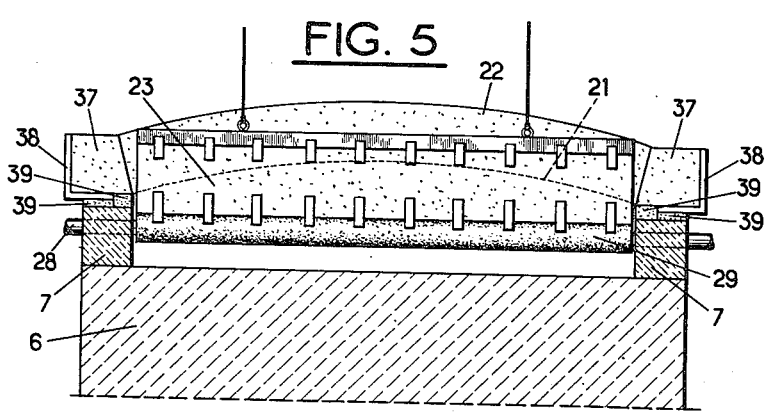
INVENTOR
Bernard Long
By Holcomb, Wetherill & Brisebois
ATTORNEYS

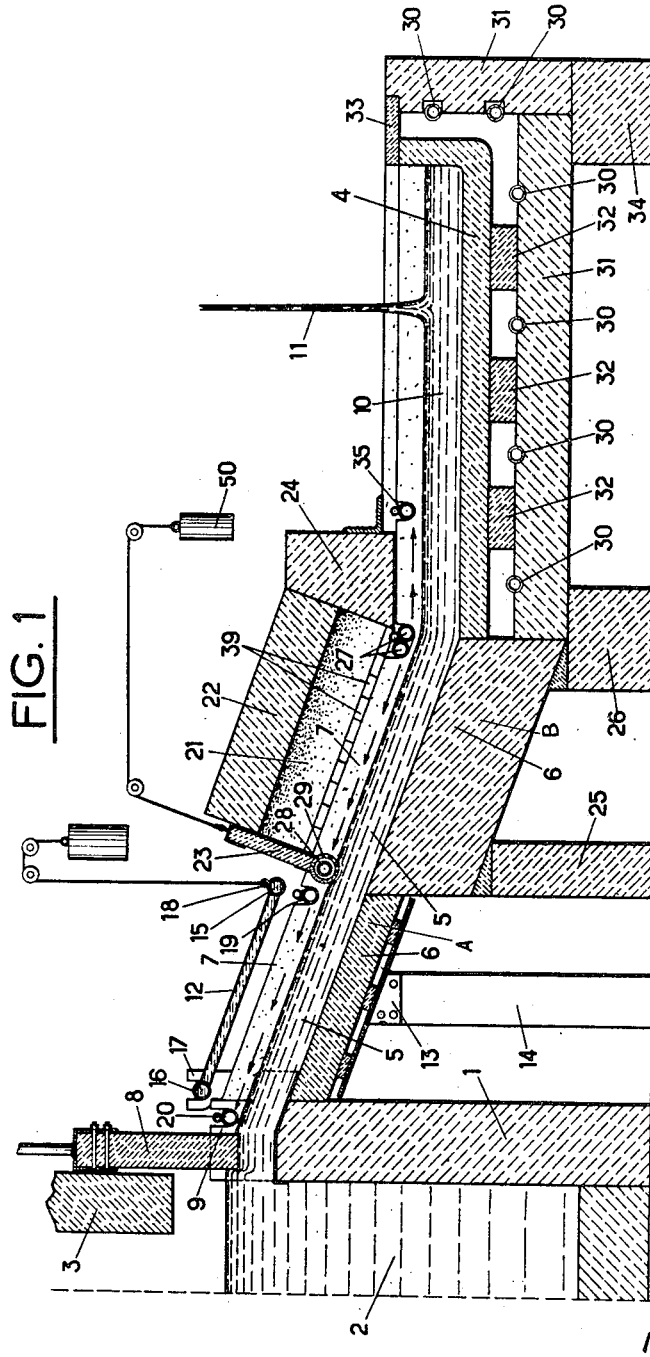

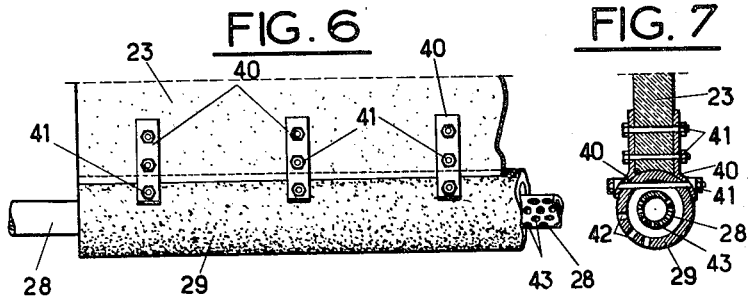
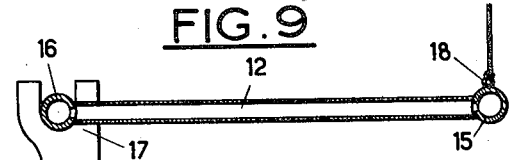
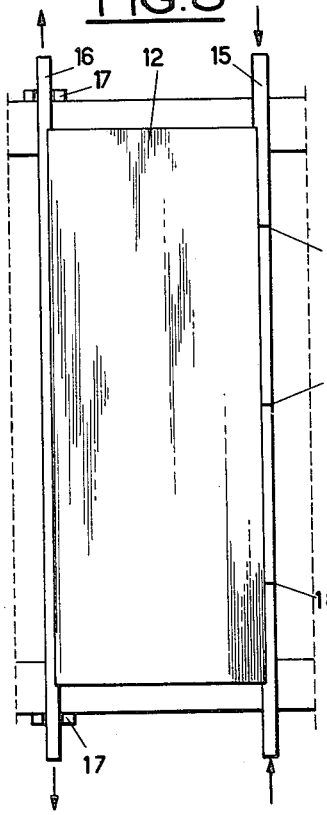
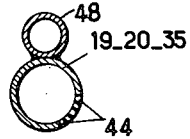
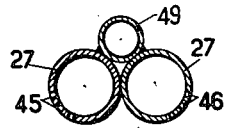
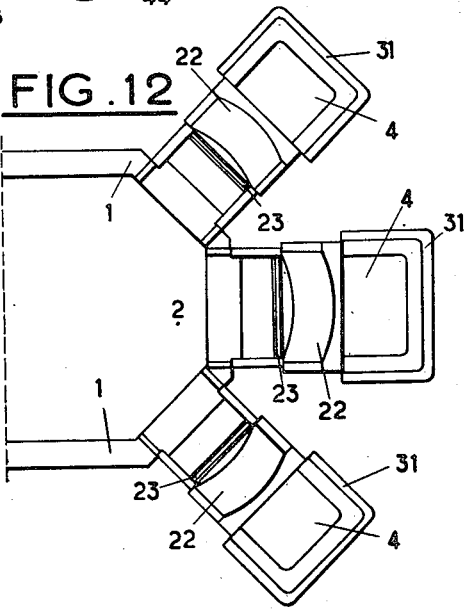

United States Patent Office 2,771,711
Patented Nov. 27, 1956

2,771,711

APPARATUS FOR CONDITIONING GLASS WHICH IS TO BE CONTINUOUSLY DRAWN INTO SHEETS

Bernard Long, Paris, France, assignor to Compagnies Reunies des Glaces & Verres Speciaux du Nord de la France, Paris, France, a corporation of France Application August 1, 1955, Serial No. 525,729

Claims priority, application France August 27, 1954

13 Claims. (Cl. 49—55)

My invention relates to apparatus for the manufacture of glass sheets by a continuous drawing process. It is particularly directed to that portion of the apparatus for thermally conditioning the glass by gradually decreasing the temperature of glass produced in a tank furnace as it moves from the place at which it has been fined or cleared to the drawing chamber.

In the course of this thermal conditioning bubbles of gas are introduced into the glass which has already been fined, frequently in considerable numbers, and the principal object of the present invention is to so regulate the heat treatment that the glass does not have any more bubbles in it when it arrives at the drawing machine than it did immediately after completion of the fining.

Another object of my invention is to so regulate the quantity of cleared glass entering the drawing chamber that it is always equal to the quantity of glass being drawn up from that chamber in sheet form. This prevents any excess of glass from flowing back from the drawing chamber into the melting tank after having already been partially cooled.

A further object of my invention is to draw the glass sheet from the open surface of the drawing bath at the same time that the incoming cleared glass is fed in under pressure. This increases the production, reduces the drawing force which must be applied to the skin of the sheet and consequently increases the smoothness of its surfaces.

The expression "conditioning for drawing" will hereinafter be used to designate those operations adapted to regulate the temperature and quantity of glass entering the drawing chamber at any given time.

It is well known that glass melted in tank furnaces preparatory to being continuously drawn into sheets by modern processes is, after having been fined, led to the drawing machines through very deep canals, and that throughout all or a major part of the length of those canals the glass is cooled progressively to the relatively low temperature (approximately 1000° C.) required for drawing.

The canals are made of refractory materials which release bubbles of gas into the previously fined glass. The bubbles of gas do not, as a rule, rise to burst at the surface of the glass on account of its relatively high viscosity, and they become even more troublesome when the glass is drawn into sheets, since the drawing operation elongates many of them.

All glass sheets manufactured by drawing processes contain a certain number of bubbles released by the refractory materials forming the walls of the canals used to cool the glass before drawing. While certain machines momentarily produce sheets containing relatively few bubbles originating in this manner, it may nevertheless be said that the problem of bubbles in drawn glass is at present far from being solved in a satisfactory manner.

Another difficulty encountered in actual practice is that the act of bringing the glass from the fining zone to the drawing chamber by means of a deep canal results in bringing to the drawing chamber at any given moment a quantity of glass greater than that which is being drawn from it.

Consequently, a substantial quantity of relatively cool glass flows back toward the melting zone where it must be reheated before being reincorporated in the stream of glass which flows from the melting zone, with its relatively high temperature, toward the drawing chamber. This reverse flow results in a by no means negligible waste of heat.

The object of my invention is to eliminate these two difficulties by permitting the fined glass produced by a tank furnace to be led from the zone in which it is fined to the drawing chamber without incorporating any additional bubbles in it, and in such a manner that the quantity of glass arriving at the drawing chamber at any given instant is equal to the quantity being drawn out. The glass is, moreover, under pressure as it enters the drawing chamber and this constitutes an important advantage.

It should be noted that, as a consequence of the last two mentioned characteristics of the invention, the fresh glass which enters the drawing receptacle pushes steadily against the glass which is already there so as to urge it to enter into the sheet being drawn up therefrom without any substantial zone forming in the drawing receptacle in which any portion of the glass lingers unduly before being drawn up.

This last mentioned condition is already partially realized in the Libbey-Owens process in which the glass is drawn from a shallow bath, but the present invention constitutes an improvement on this technique in that the incoming glass is brought in under pressure by means of an inclined canal.

The improved apparatus constituting the invention consists essentially in means for cooling a stream of cleared glass in an abrupt but controlled manner, while running it rapidly down through a short inclined canal which connects the fining zone of the tank furnace with a drawing chamber, the cooling being carried out by means of successive radiation and convection coolers which permit the regulation not only of the temperature of the surface, but also of the temperature gradient between its surface and lower levels, with the volume of flow of the stream being maintained constantly equal to the volume of glass under pressure which is continuously drawn up into the sheet from the drawing bath.

In order to clearly understand the advantages of the invention in meeting the problem presented by bubbles, consideration should be given to the fact that by feeding the drawing chamber by means of a shallow stream of cleared glass and cooling this stream abruptly at its beginning by means of radiation coolers, the layers of glass in contact with the refractory material of the canal walls are cooled instantly to a temperature which is sufficiently low that no bubbles are released.

These refractory materials are, moreover, selected from among those having a fine and compact structure which have a comparatively slight tendency to emit bubbles when the glass is brought into contact therewith, such as those produced by an electrothermic process and containing principally corundum and/or mullite.

It is then possible to completely eliminate the problem of bubbles by additionally covering the inner surface of the beginning of the canal with a lining of non-porous material which cannot be attacked by the glass, such as platinum.

The slope of the canal makes it possible to use a gate to vary the depth, and consequently the volume of flow, of the stream of glass. This slope also gives rise to an ancillary opportunity for regulation of the volume of flow which is lacking in present methods of feeding the baths from which the sheets of glass are drawn, since for a given output it is possible to slightly vary the speed of the stream as a function of temperature control.

The slope of the canal should lie between 10° and 30° with respect to the horizontal and best results are secured at about 20°. It should be noted that this slope increases the speed of flow in the canal.

As will readily be understood, all other things being equal, an increase in the speed of the stream of glass in contact with the refractory materials reduces the risk that new bubbles will be incorporated in it.

Moreover, since my canal is much shorter and shallower than conventional level canals, ordinarily less than 2 meters in length as compared with 10–12 meters for the latter, the duration of the contact between the glass and the refractory walls is still further reduced on that account, with a consequent additional reduction in the risk that new bubbles will be formed.

The following important advantage should also be emphasized: Since the glass enters the drawing receptacle under a certain pressure, the drawing of the sheet is substantially facilitated because, as has already been pointed out, the draw bath has practically no zone of eddying.

The fact that the glass being drawn is under a certain pressure results in considerably reducing the drawing effort for a given thickness and it follows that defects in the surface of the sheet caused by superficial irregularities in its viscosity are considerably reduced, an advantage of increasing importance, since purchasers are becoming more and more insistent upon sheets having excellent surface qualities.

In order to bring out the essence of the invention, it should be emphasized that the apparatus heretofore described permits the regulation of the three essential characteristics of a drawing bath just before the glass therein encounters the cooling means which form the foot of the sheet and which complete, within necessarily narrow limits, the thermal conditioning of the glass which enters into the sheet.

These three essential characteristics are:
1. The temperature of the surface of the bath;
2. The temperature gradient from the surface of the bath to its bottom;
3. The flow of glass arriving at the drawing zone.

The fact that the influx of fined glass is constantly equal to the output of drawn glass, and that the stream which travels forward to the draw pot is not deep renders negligible the effect of transverse convection. Per contra, transverse convection plays an active part in all conditioning processes heretofore in actual use, since the net flow of glass from the clearing zone to the drawing chamber takes up only a portion of the height of the deep canal which connects these two compartments. It is, therefore, difficult to regulate the temperature of the surface and practically impossible to regulate the temperature gradient of the layer which is about to become the layer being drawn up, since the temperature of this layer is constantly changing as the result of transverse convection. Now it is already known that not only the temperature of this layer, but also the temperature gradient within it, have a great influence on the mechanical stability of the sheet and on its drawing speed.

The conditioning apparatus which constitutes the subject matter of my invention permits the cleared glass to be led to the sheet without incorporating any additional bubbles in it while simultaneously affording a clear superiority over previously known conditioning apparatuses in that it brings into play means which will be hereinafter described for regulating the feeding of fresh glass into the drawing chamber under pressure, the temperature of its surface, and the temperature gradient in the layer being drawn up.

The flow of cleared glass is regulated by means of a simple gate-valve, already well known in itself, and made of a refractory material, which controls the depth of the stream of glass permitted to flow from the fining zone of the tank furnace.

This flow may be regulated by manually actuated means for raising the gate, but it is usually preferable to control it automatically by means similar to those presently used to maintain a constant level in the bath of glass in the tank furnace.

The stream of fined glass between the furnace and the drawing receptacle is cooled by means of successive radiation and convection coolers in order to insure, on the one hand, the sudden cooling of the lower layer of glass in contact with the refractory materials and, on the other hand, convectively regulate the surface temperature and the temperature gradient within the glass to those temperatures most favorable for drawing at high speeds.

The object of the sudden initial cooling is to reach the glass in contact with the bottom and sides of the canal and this is brought about through radiation by means of the customary blackened boxes or tubes through which water circulates, and which are placed above the stream of glass and through heat loss by the relatively thin floor of the canal.

This cooling by radiation is associated with a slight steady cooling due to a convective air current, the purpose of which is simply to prevent air which has been cooled by contact with the water coolers from being brought, by the force of gravity, into contact with the surface of the stream of glass where it would create irregularities in temperature as a consequence of convective irregularities.

This regular sweeping up of air from about the water coolers is accomplished by means of a blowing tube and a suction tube perpendicularly disposed with respect to the direction in which the glass is flowing.

Care should be taken that this sweeping up of air does not, while preventing access by the cool air which falls from the water-coolers to the stream of glass, too greatly decrease the temperature of the stream's surface, since this could render it too heat absorbent and interfere with the effect of cooling by radiation on the lower layer.

After the abrupt cooling by radiation, the surface temperature and the temperature gradient within the glass are regulated by means of one or more suction tube and blower sets spaced along the length of the canal. This convective cooling is inevitably supplemented by some slight cooling by radiation into the masonry covering the canal and surrounding the suction tube and blower sets.

For best results the stream of glass should be between 10 and 20 cm. deep and the temperature of the lower layer of glass in contact with the refractory materials should be abruptly reduced from 1200–1250° C. prevailing in the fining zone to about 1050–1100° C. in the radiation cooling section of the canal. In order to bring about this sudden reduction in temperature, I rely not only on the water cooling means which have already been mentioned but also on an unusually thin floor for the radiation cooling section of the canal, one which is less than 10 cm. thick, so that heat may be readily lost therethrough. The water coolers in the radiation cooling section are so adjusted as to cool the upper layers of the stream of glass to approximately the same temperature as that to which the thin floor cools its lower layers, and the glass will ordinarily enter the convection cooling section at about 1020° C. Here the floor is approximately 30 cm. thick and does not materially cool the lower layer of glass, but the surface is convectively cooled to form a skin to facilitate drawing, so that the temperature of the lowest layer of glass at the entrance to the drawing bath will be about 1000° C., while that of its surface layer will be reduced approximately 900° C.

From the fining chamber of a tank furnace several canals usually branch off, which may be either parallel or divergent, each feeding a drawpot, and the sheets drawn from those pots may be of the same or of different widths.

As has already been mentioned the drawing receptacles are necessarily shallow (from 10 to 20 cm. deep) and resemble the drawpots used in the Libbey-Owens process. They are preferably made of a single piece of material having relatively thin walls. Each drawing receptacle rests inside an insulating enclosure, which may be heated, preferably by electric resistance means.

The glass sheet is drawn from the open surface of the bath between coolers of a known type, and may be bent over a roller at a certain height above the bath, or preferably, cooled while in a completely vertical position. In the latter case the superstructure of the drawing chamber is completely closed and the connection between the insulating enclosure and the superstructure supporting the vertical annealing passageway is made as airtight as possible.

These last arrangements are described purely as a matter of information and will not hereinafter be illustrated, since the present invention relates only to conditioning preparatory to drawing.

In order that my invention may be clearly understood certain means for carrying it out are illustrated in the accompanying drawings, solely by way of example, since the scope of the invention is not limited to the particular apparatus shown. In the drawings:

Figure 1 is a vertical cross-section taken through the longitudinal axis of the discharge canal showing the end of the fining compartment and means for conditioning the glass for drawing along the inclined canal to the drawing receptacle;

Figure 2 is a vertical cross-section taken transversely of the longitudinal axis of the canal showing the upper part of the canal and the discharge sill, with the water cooler and air suction tube removed;

Figure 3 is a partial vertical cross-section on an enlarged scale showing the discharge sill, the beginning of the discharge canal with the regulating gate in its raised position and the platinum lining which may be employed;

Figure 4 is a view similar to Fig. 3 showing an alternative arrangement in which the glass is withdrawn from the bath in the furnace through an opening in the wall of the fining chamber a certain distance below the surface of the bath;

Figure 5 is a view taken transversely to the longitudinal axis of the discharge canal showing the entrance to the convection cooling chamber in elevation and the bottom and side walls of the discharge canal in cross-section;

Figure 6 and Figure 7 are detail views showing in elevation and transverse cross-section, respectively, the lower part of the entrance gate to the convection cooling chamber;

Figure 8 and Figure 9 are fragmentary views showing the water cooling means in elevation and transverse cross-section, respectively;

Figure 10 is a transverse cross-section of the assembly formed by a suction or blower tube surmounted by a water cooling tube;

Figure 11 is a similar transverse cross-section showing two blower tubes and one water cooling tube; and Figure 12 is a schematic plan view showing the clearing chamber of a tank furnace feeding three drawing receptacles through three discharge canals, without the cooling means associated therewith.

As shown in Figure 1, the bath of fined glass is in contact with the end wall 1 provided with the sill over which the stream of glass 5 flows. Its flow is regulated by the gate 8 which is slidable along the side of the superstructure wall 3. The stream runs down the canal formed by the inclined floor 6 and the two side walls 7 into the drawing receptacle 4 and mingles with the bath 10, from the surface of which the sheet 11 is drawn.

Immediately after the stream passes under the gate 8, which regulates its flow to an amount equal to that which is drawn into the sheet 11, it is subjected to radiation cooling by the water cooler 12 which extends across the entire width of the canal and is positioned at such a height above the stream of glass as to permit it to cool the glass in contact with the floor to a temperature slightly above that required for the lower portion of the glass at the entrance to the drawing receptacle.

The floor 6 is relatively thin (less than 10 cm. thick) at the part A where the stream of glass is cooled by radiation. This is because it is desirable to permit a relatively high heat loss, through this floor, in order to assist in the cooling of the lower layers of the stream of glass. This first part A of the floor is supported by a metal brace 13 connected to the pillar 14.

The cooling effect exerted by the cooler 12 is regulated by turning it about the horizontal axis formed by the discharge tube 16 which carries off the water which enters through the tube 15. The tube 16 rests on two forks 17.

In order to avoid irregularities in the surface temperature of the bath due to contact with air which has been cooled by contact with the water cooler 12, it is necessary to sweep the surface of the stream of glass beneath the cooler 12 with a current of air. This stream of air, which should be faint so as to avoid more than a slight convective effect, emanates from the blower pipe 19 and is drawn up by the suction pipe 20.

These two pipes are made of stainless steel and are provided with several rows of holes in their sides in order to evenly distribute the flow of air a short distance from the tubes.

The tube 19 rests in two opposing notches in the lateral walls of the discharge canal.

The tube 20 rests in a like manner in notches in the members 9 which limit the width of the stream of glass at its beginning.

After having been subjected to controlled cooling by radiation the stream of glass 5 is further cooled by convection in a regulable manner so that it will possess the proper surface temperature when it enters the drawing receptacle.

This convective cooling takes place inside the enclosure 21 bounded at its bottom by the canal, at its top by the vault 22, at its entrance by the gate 23, and at its exit by the refractory member 24.

The floor 6B beneath the enclosure 21 is relatively thick (about 30 cm.) so that the lower layers of the stream of glass cool only slightly while the surface temperature is being regulated. This second part B of the floor 6 is supported by pillars 25 and 26.

Air is blown across the surface of the glass from one of the twin blower tubes 27 and drawn up by the suction tube 28 which is mounted within a tube of vitreous silica 29 attached to the bottom of the gate 23.

Since the weight of the gate 23 is balanced by the counterweights 50, the vitreous silica tube rests very lightly across the surface of the stream of glass, thus effecting an airtight contact between the gate and the glass stream. Those walls of the tube 29 which lie inside the enclosure and are not in contact with the glass stream are provided with a series of holes. It will be readily appreciated that air blown out through the tube 27 circulates in a layer across the surface of the glass before being drawn in through the tube 28, which is provided with holes all over its outer surface.

The convective cooling is regulated by the speed of the air blown out of the tube 27 and drawn into the tube 28.

It should be noted that as the glass stream flows through the enclosure 21, it loses a certain amount of heat by radiation to the superstructure, especially to the vault 22. This loss affects the layer of glass in contact with the thick floor 6 only slightly. As already pointed out, the effect of this loss of heat is allowed for in regulating the initial cooling by radiation. When it arrives at the lower end of the canal, the stream of glass enters the drawing receptacle and forms the drawing bath.

If the thermal condition of the stream of glass at the time it enters the bath has been perfectly regulated, it is easy to bring it into the best condition for drawing by conventional cooling means located near the foot of the sheet (not shown in Figure 1) while maintaining the outer surface of the drawing receptacle at the proper temperature through electric heating by means of the heating rings 30 mounted in a cradle 31 in which the drawing receptacle is seated on bricks 32.

The space between the receptacle 4 and the cradle 31 is closed by means of bricks 33.

The cradle 31 is supported by pillars 26 and 34. It is provided in order to facilitate the eventual formation of a "skin" of high viscosity at the surface of the bath of glass in accordance with the process described in applicant's United States application Serial No. 335,286, filed February 5, 1953, by combining blowing through the right hand tube of the blowing assembly 27 with suction through the tube 35. These tubes, which are provided with several rows of holes like those in the tubes 19 and 20, are made of stainless steel.

The superstructure of the drawing receptacle is not illustrated because the drawn sheet 11 may be cooled and annealed either in a vertical position or after being bent over a roller.

In order to bring out the essence of the invention, some specific information will be given as to the condition of the glass after it has been fined and before it enters the canal which is to condition it for drawing.

The glass is then at a relatively high temperature and contains relatively few bubbles arising from the refractory materials in the walls.

To be specific, the temperature at the surface of the bath of glass 2 may vary between 1200 and 1250° C. according to its composition. This will be reduced to about 1020° C. by the abrupt radiation cooling means, for both top and bottom layers of glass. The convection cooling means will then reduce the surface temperature about 100° more than it reduces the temperature of the lowest layer, in order to form a skin on the surface. The temperature of the stream of glass at the entrance to the drawing receptacle should thus run to about 900° C. at its surface and approximately 1000° C. near the bottom. It will be appreciated that these figures will vary somewhat according to the composition of the glass, but the relationship between them will remain fairly constant.

It should be emphasized that one of the basic concepts underlying the invention is to take fined glass from the point at which it may be found in every tank furnace and subject it to a conditioning such that the adjacent refractory materials do not emit additional bubbles into it. This results in limiting the length of tank furnaces beyond the zone at which the bubbles rise to the surface of the bath, which zone has been called the zone in which fining is completed.

Certainly in all tank furnaces which function normally there is a zone in which the layer of fine glass may be found on the surface, and the best proof of this is furnished by furnaces equipped with a rolling mill for rolling glass taken from this zone at a relatively high temperature into rough plate glass.

The desirability of feeding the drawing bath under pressure while the sheet is being drawn has already been pointed out. This method is particularly advantageous when it is associated with the process described in applicant's United States application Ser. No. 335,286, filed February 5, 1953, which permits the drawing speed to be increased by giving the sheet a skin of high viscosity which encloses a central portion having a relatively low viscosity.

The very substantial force which must be applied to the skin is significantly diminished by feeding the less viscous heart of the sheet under pressure. The surfaces of sheets manufactured in this manner are particularly smooth.

Figure 2 requires little explanation.

The control gate 8 for regulating the flow of the stream, which is made of a refractory material highly resistant to erosion by the glass, carries an iron binding solidly fixed to its upper edge and to the two metal arms by means of which the gate is raised and lowered (by mechanism not shown) are welded to this binding.

The purpose of this gate is to limit the flow of glass at any given moment to the amount which is being drawn up into the sheet and consequently to maintain the glass in the drawing bath at a constant level for a given temperature.

The lower part of the gate 8 which touches the stream of glass is slightly wider than the entrance to the canal.

At the entrance sill of the canal the stream is laterally restrained by the two refractory members 9, each of which is provided with a notch in which one end of the suction tube 20 rests. (See Figures 1 and 3.)

As shown in Figure 3, this sill is lined with a sheet of platinum 36 protecting the glass from contact with the two refractory members 9. The platinum sheet also covers the joint between the floor of the canal and the wall 1 of the fining zone, a joint which has a tendency to liberate bubbles.

As shown in Figure 4, the open surface 47 of the bath of glass 2 is above the top of the opening through which the stream of glass 5 passes out under the control of the gate 8. Taking glass from this point offers the advantage of a greater initial speed of the glass stream while it is in contact with the refractory materials of the wall 1 and the hearth 6.

Figure 5 shows the means for closing the convective cooling chamber at the end through which the stream of glass enters. The vitreous silica tube 29 which forms the bottom of the gate 23 is so lightly in contact with the surface of the stream of glass that it does not materially slow down the flow. The tube 28 which sucks up the air which has convectively cooled the surface of the glass is seated in two notches cut into the lateral walls 7.

The vault 22 rests on the two summers 37 supported by the angle-irons 38, which are fixed to anchorages (not illustrated). The joints between the vault and the walls 7 are formed by two wedging bricks 39.

Figures 6 and 7 show the manner in which the silica tube 29 is fixed to the lower part of the gate 23. Each of the supporting straps 40 is connected at one end of the refractory material of the gate 23 by means of two bolts 41 and, at the other end, to the tube 29 by means of an additional bolt. This tube is pierced by holes 42 through that part of its outer surface located above the glass and on the inside of the enclosure 21. The suction tube 28, which is inside the tube 29, is of stainless steel and is provided with holes 43 all over its outer surface.

As shown in Figures 8 and 9, the water enters the cooler 12 through the tube 15 and leaves through the tube 16 which rests in the two forks 17 and serves as an axis of rotation. The cords from which the cooler is suspended are attached to rings 18 welded to the tube 15.

Figure 10 shows the assembly of the three tubes 19, 20 and 35. They are made of stainless steel and provided with holes 44 in the side through which the air is blown out or drawn in as the case may be. Each of these tubes is surrounded by a water circulating tube 48 which is welded to it at several points.

Figure 11 shows the assembly comprising two blowing tubes 27 together with a water circulating tube 49. The air passes out of the holes 46 and 45.

Figure 12 shows the conditioning canals, each feeding a drawing receptacle and each leading from the wall 1 of a single fining zone 2. The center canal is shown wider than the two canals on either side of it, but all may, of course, be of the same width.

Despite their substantially different positions with respect to the furnace, the three drawing machines offer the same possibilities for drawing when provided with like means for regulating the conditioning of the glass.

It will be appreciated that the invention is not limited to the specific embodiment shown herein, and that various mechanical equivalents may be substituted for the individual elements illustrated without departing from the spirit of my invention.

I claim:

1. Apparatus for conditioning fined molten glass just leaving the end of the fining zone of the tank furnace immediately before it enters into the receptacle from which it is to be drawn into sheets, said apparatus comprising an inclined canal leading downwardly from said tank furnace to said drawing receptacle, said canal having a first portion provided with means for cooling the glass therein primarily by radiation and an enclosed second portion provided with means for convectively cooling said glass, the floor of the first portion of said canal being relatively thin so as to bring about an important heat loss therethrough, and the floor of the second portion of said canal being relatively thick so as to reduce heat loss therethrough.

2. Apparatus as claimed in claim 1 in which said first portion is provided with water coolers, the position of which is adjustable relative to the surface of the glass.

3. Apparatus as claimed in claim 2 comprising means by which a current of air is directed upwardly above the surface of the glass between the glass and the water coolers to prevent air which has contacted said coolers from reaching the surface of the glass.

4. Apparatus as claimed in claim 1 in which said canal is inclined at an angle between 10° and 30° to the horizontal.

5. Apparatus for conditioning fined molten glass just leaving the end of the fining zone of the tank furnace immediately before it enters into the receptacle from which it is to be drawn into sheets, said apparatus comprising an inclined canal leading downwardly from the said tank furnace to the said drawing receptacle, said canal being divided into a first portion in which the glass is cooled primarily by radiation and an enclosed second portion in which the glass is cooled primarily by means of convection, said enclosed second portion being provided with means for directing a flow of cooling air from a point near the exit end of said enclosed second portion upwardly along the surface of the glass to a point near the inlet end of said enclosed second portion, and means for withdrawing said air near said inlet end.

6. Apparatus as claimed in claim 5 in which said second portion is provided with relatively thick walls and a relatively thick floor in order to reduce loss of heat therethrough.

7. Apparatus as claimed in claim 6 in which the inlet end of said enclosed second portion is closed by a counterweighted sliding gate which rests lightly on the surface of the glass.

8. Apparatus as claimed in claim 7 in which the means for withdrawing air from said second portion is carried by said sliding gate.

9. Apparatus as claimed in claim 8 in which said first portion is provided with water coolers, the position of which is adjustable relative to the surface of the glass.

10. Apparatus as claimed in claim 9 comprising means by which a current of air is directed upwardly above the surface of the glass between the glass and the water coolers to prevent air which has contacted said coolers from reaching the surface of the glass.

11. Apparatus as claimed in claim 1 in which the flow of glass in said inclined canal is controlled by a sliding gate mounted in the wall of the tank furnace.

12. Apparatus as claimed in claim 11 in which said gate regulates an opening which is beneath the surface of the glass in said tank furnace.

13. Apparatus as claimed in claim 12 in which the lower edge of said opening and the upper end of the floor of said canal are lined with a protective sheet of platinum.

References Cited in the file of this patent

UNITED STATES PATENTS

| | | |
|---|---|---|
| 1,489,823 | Crowley | Apr. 8, 1924 |
| 1,554,851 | Hitchock | Sept. 22, 1925 |
| 1,863,156 | Frink | June 14, 1932 |